(12) United States Patent
Chikazawa

(10) Patent No.: US 7,058,390 B2
(45) Date of Patent: Jun. 6, 2006

(54) MOBILE COMMUNICATION SYSTEM USING AN ENCRYPTION/DECRYPTION DEVICE

(75) Inventor: Takeshi Chikazawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 527 days.

(21) Appl. No.: 10/048,559

(22) PCT Filed: Jun. 14, 2001

(86) PCT No.: PCT/JP01/05051
§ 371 (c)(1),
(2), (4) Date: Feb. 4, 2002

(87) PCT Pub. No.: WO01/97551
PCT Pub. Date: Dec. 20, 2001

(65) Prior Publication Data
US 2002/0107001 A1   Aug. 8, 2002

(30) Foreign Application Priority Data
Jun. 15, 2000   (JP) .............................. 2000-179288

(51) Int. Cl.
*H04M 3/16* (2006.01)
(52) U.S. Cl. .................. 455/411; 455/410; 455/561; 380/247; 380/270; 713/168; 713/171
(58) Field of Classification Search ................ 455/410, 455/422.1, 426.1, 26.1, 403, 411, 561; 380/247, 380/255, 259, 270, 272, 274; 713/168, 171
See application file for complete search history.

(56) References Cited

U.S. PATENT DOCUMENTS

| | | | |
|---|---|---|---|
| 4,864,615 A | | 9/1989 | Bennett et al. |
| 5,794,139 A | * | 8/1998 | Mizikovsky et al. ........ 455/403 |
| 5,909,491 A | * | 6/1999 | Luo ............................ 380/270 |
| 5,960,338 A | | 9/1999 | Foti |
| 6,108,424 A | * | 8/2000 | Pitiot ......................... 380/270 |
| 6,128,735 A | | 10/2000 | Goldstein et al. |
| 6,137,885 A | * | 10/2000 | Totaro et al. ............... 380/247 |
| 6,223,285 B1 | | 4/2001 | Komuro et al. |
| 6,373,946 B1 | | 4/2002 | Johnston |
| 6,377,687 B1 | | 4/2002 | Etzel et al. |
| 6,385,316 B1 | * | 5/2002 | Rose ........................... 380/28 |
| 6,449,473 B1 | * | 9/2002 | Raivisto ..................... 455/410 |
| 6,535,979 B1 | | 3/2003 | Vialen et al. |
| 6,556,835 B1 | * | 4/2003 | Raivisto ..................... 455/466 |
| 6,704,789 B1 | * | 3/2004 | Ala-Laurila et al. ........ 709/230 |
| 6,766,160 B1 | * | 7/2004 | Lemilainen et al. ........ 455/411 |
| 6,876,744 B1 | | 4/2005 | Etzel et al. |
| 2002/0086665 A1 | * | 7/2002 | Maggenti et al. ........... 455/416 |

FOREIGN PATENT DOCUMENTS

EP   0343805 A   11/1989
EP   0851928 A   7/1998

(Continued)

*Primary Examiner*—Danh Cong Le
(74) *Attorney, Agent, or Firm*—Birch, Stewart, Kolasch & Birch, LLP

(57) ABSTRACT

The present invention aims to downsize a configuration for achieving confidentiality of data on an air link of a mobile terminal and/or data for communication with a partner terminal. A mobile terminal 1 communicating with plural base stations 4 and 1004 for providing plural different mobile communication networks/services achieves confidentiality of data on plural air links among the plural base stations 4 and 1004 using a single encrypting/decrypting unit 3.

2 Claims, 4 Drawing Sheets

FOREIGN PATENT DOCUMENTS

| | | |
|---|---|---|
| EP | 0957651 A | 11/1999 |
| JP | 5-153042 | 6/1993 |
| JP | 8-186875 | 7/1996 |
| JP | 11-505678 | 5/1999 |
| WO | WO-99/07103 A | 2/1999 |
| WO | WO-99/22372 A | 5/1999 |
| WO | WO-99/27654 A | 6/1999 |
| WO | WO-99/39525 A | 8/1999 |

* cited by examiner

MOBILE COMMUNICATION SYSTEM USING AN ENCRYPTION/DECRYPTION DEVICE This application is the national phase under 35 U.S.C. § 371 of PCT International Application No. PCT/JP01/05051 which has an International filing date of Jun. 14, 2001, which designated the United States of America.

TECHNICAL FIELD

The present invention relates to mobile communication.

BACKGROUND ART

Related Art 1

FIG. 3 shows, for example, a mobile communication system of a related art. The system shows a case in which plural different mobile communication networks/services are available to a single mobile terminal.

In FIG. 3, base stations 14 and 114 respectively provide different mobile communication networks/services.

The operation will be explained in the following.

In a mobile communication network/service A, data 200 is first input to a control/communication unit 12 of a mobile terminal 11, the input data is encrypted by an encrypting/decrypting unit 13, and radio data 201 is output from the control/communication unit 12. At the base station 14 which receives the radio data 201, the radio data 201 is decrypted by an encrypting/decrypting unit 113, and the original data 200 is obtained. On the other hand, when the mobile terminal 11 receives the data 201 encrypted by the encrypting/decrypting unit 113 in the base station 14, the data 201 is decrypted by the encrypting/decrypting unit 13 through the control/communication unit 12, and the original data 200 is obtained.

In another mobile communication network/service B, the data 200 is first input to the control/communication 12 of the mobile terminal 11, the data 200 is encrypted by an encrypting/decrypting unit 15, and radio data 1201 is output from the control/communication unit 12. The base station which receives the radio data 1201 decrypts the radio data 1201 using an encrypting/decrypting unit 115, and the original data 200 is obtained. Further, when the mobile terminal 11 receives the radio data 1201 encrypted at the base station 114, the radio data 1201 is decrypted by the encrypting/decrypting unit 15 through the control/communication unit 12, and the original data 200 is obtained.

Related Art 2

FIG. 4 shows, for example, a mobile communication system of another related art. The system shows a case in which a single usual mobile communication network/service is used.

In FIG. 4, a base station 16 provides a partner terminal 17 with a mobile communication network/service through an air link.

The operation will be described in the following.

In a mobile communication network/service, the data 200 is first input to the control/communication unit 12 of the mobile terminal 11, and the data 200 is encrypted using a common key (hereinafter, referred to as common key A), which is shared between the mobile terminal 11 and the partner terminal 17, by the encrypting/decrypting unit 13. The encrypted result is processed by the control/communication unit 12, if necessary, the result is further encrypted using a common key (hereinafter, referred to as common key B), which is shared between the mobile terminal 11 and the base station 14, by the encrypting/decrypting unit 15, and the radio data 201 is output from the control/communication unit 12. At the base station 14 which receives the radio data 201, the radio data 201 is decrypted using the common key B by the encrypting/decrypting unit 115, and the decrypted data is sent to the base station 16 of the partner terminal. At the base station 16, the decrypted data is encrypted using a common key (hereinafter, referred to as common key C), which is shared between the partner terminal 17 and the base station 16, by the encrypting/decrypting unit 116, and the radio data 202 is output. At the partner terminal 17 which receives the radio data 202, the radio data 202 is decrypted using the common key C by the encrypting/decrypting unit 19 through the control/communication unit 18. The decrypted result is processed by the control/communication unit 18, if necessary, the result is further decrypted using the common key A by the encrypting/decrypting unit 20, and the original data 200 is obtained.

In the above mobile communication of the related arts, there is a problem that plural kinds of encrypting/decrypting units are necessary when plural different mobile communication networks/services are made available to a single mobile terminal and when a confidentiality of data is achieved not only on the air link among the plural base stations but also data for communication with the partner terminal.

The present invention is provided to solve the above problems and aims to downsize the mobile terminal.

DISCLOSURE OF THE INVENTION

According to the present invention a mobile communication system, in which a mobile terminal communicating with plural base stations for providing plural different mobile communication networks/services achieves confidentiality of data on plural air links among the plural base stations using a single encrypting/decrypting unit.

According to the present invention, a mobile communication system, in which a mobile terminal achieves confidentiality of data for communication with a base station on an air link and with a partner terminal connected via the air link using a single encrypting/decrypting unit.

According to the present invention, a mobile communication system, in which a mobile terminal communicating with plural base stations for providing plural different mobile communication networks/services achieves confidentiality of data on plural air links among the plural base stations and data for communication with a partner terminal connected via the air link using a single encrypting/decrypting unit.

BEST MODE FOR CARRYING OUT THE INVENTION

EMBODIMENT 1

In the first embodiment, a mobile communication system will be explained in case of plural different mobile communication networks/services, a single mobile terminal uses the same encrypting/decrypting unit for achieving confidentiality of data on plural air links among base stations.

Figure 1:
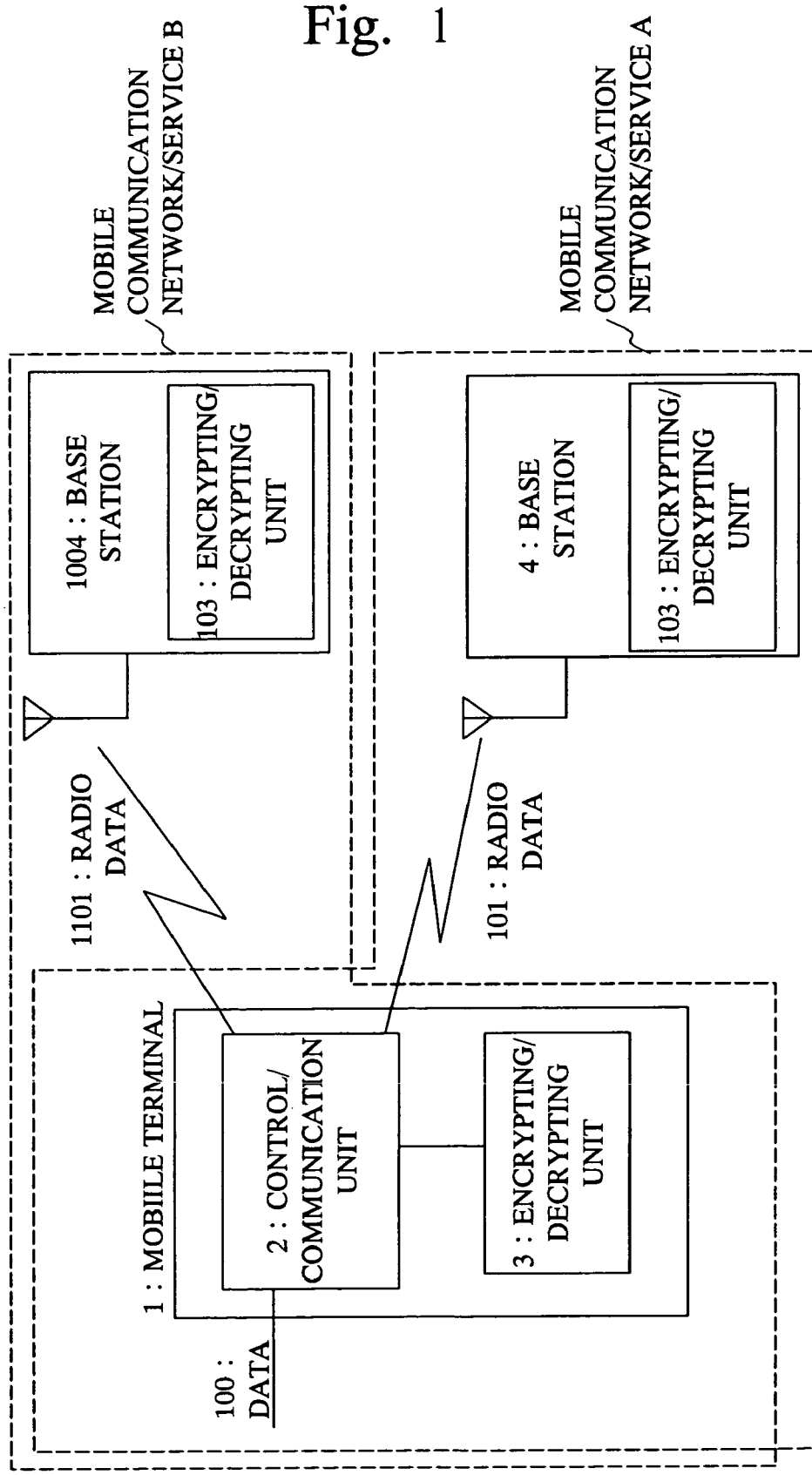
FIG. 1 is a block diagram showing the first embodiment of the invention.

FIG. 1 shows a system configuration of the mobile communication system according to this embodiment of the invention.

In the figure, a reference numeral 1 shows a mobile terminal, 2 shows a control/communication unit, 3 shows an encrypting/decrypting unit performing processes for encryption/decryption, and 4 shows a base station. 1004 shows another base station which provides another mobile communication network/service different from the one provided by the base station 4. 103 show encryption/decryption units which are included on the base stations 4 and 1004, respectively and are the same as the encrypting/decrypting unit 3.

Next, the operation will be explained.

In a mobile communication network/service A, data 100 is first input to the control/communication unit 2 of the mobile terminal 1, the data 100 is encrypted by the encrypting/decrypting unit 3, and radio data 101 is output from the control/communication unit 2. At the base station 4 which receives the radio data 101, the radio data 101 is decrypted by the encrypting/decrypting unit 103, and the original data 100 is obtained. And when the mobile terminal 1 receives the radio data 101 encrypted by the encrypting/decrypting unit 103 of the base station 4, the radio data 101 is decrypted by the encryption/decryption unit 3 through the control/communication unit 2, and the original data 100 is obtained.

Further, in another mobile communication network/service B, the mobile terminal 1 and the base station 1004 can send/receive radio data 1101 in similar manner to the above case using the encrypting/decrypting units 3 and 103 which are the same.

As discussed above, when plural different mobile communication networks/services A and B are employed, the mobile terminal 1 and the base stations 4 and 1004 (the base station can be single or plural) encrypts/decrypts each data on the air links using the same encrypting/decrypting units 3. Accordingly, there is no need to include plural kinds of encrypting/decrypting units, so that the mobile terminal can be downsized.

In the above case, the control/communication unit 2 and the encrypting/decrypting unit 3 can be configured as one unit. Further, as described above, the encrypting/decrypting units 3 and 103 can be the same.

EMBODIMENT 2

In the above explanation of the first embodiment, a single mobile terminal achieve confidentiality of the data on plural air links among the base stations using the same encrypting/decrypting units in case of plural different mobile communication networks/services employed. Next, another embodiment will be explained, in which the mobile terminal achieves confidentiality of the data for communication with the base station and with a partner terminal using the same encrypting/decrypting unit, respectively, in case of a single mobile communication network/service employed.

Figure 2:
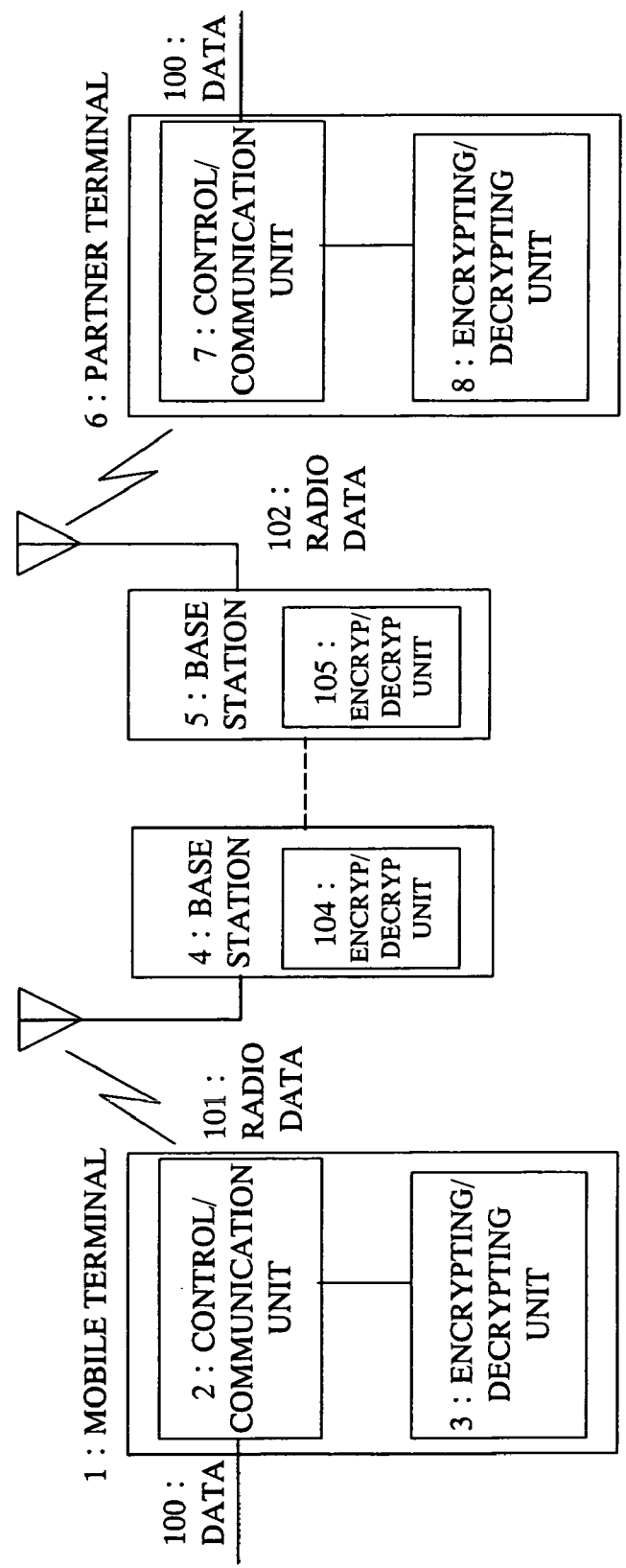
FIG. 2 is a block diagram showing the second embodiment of the invention.
Figure 3:
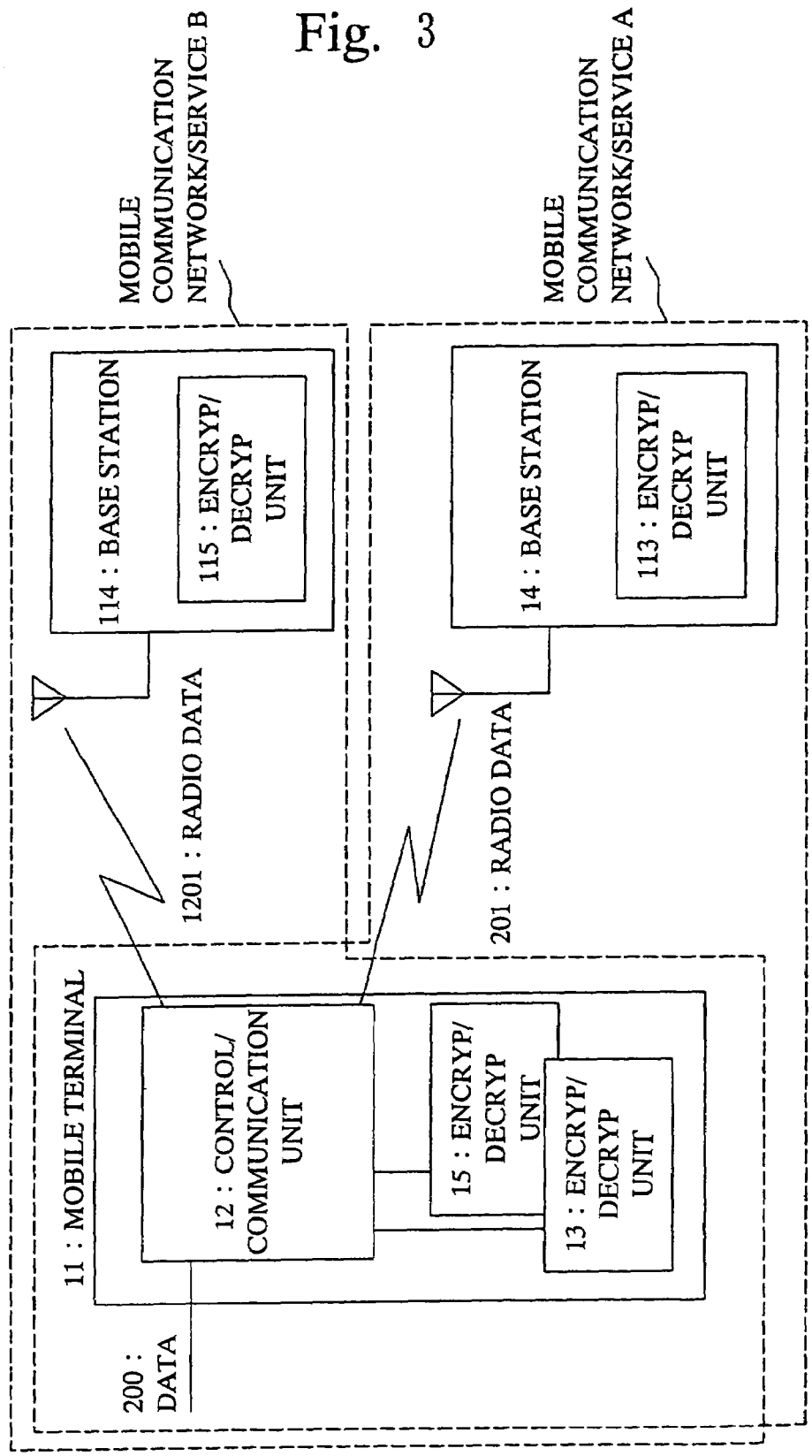
FIG. 3 is a block diagram showing an embodiment of a related art.
Figure 4:
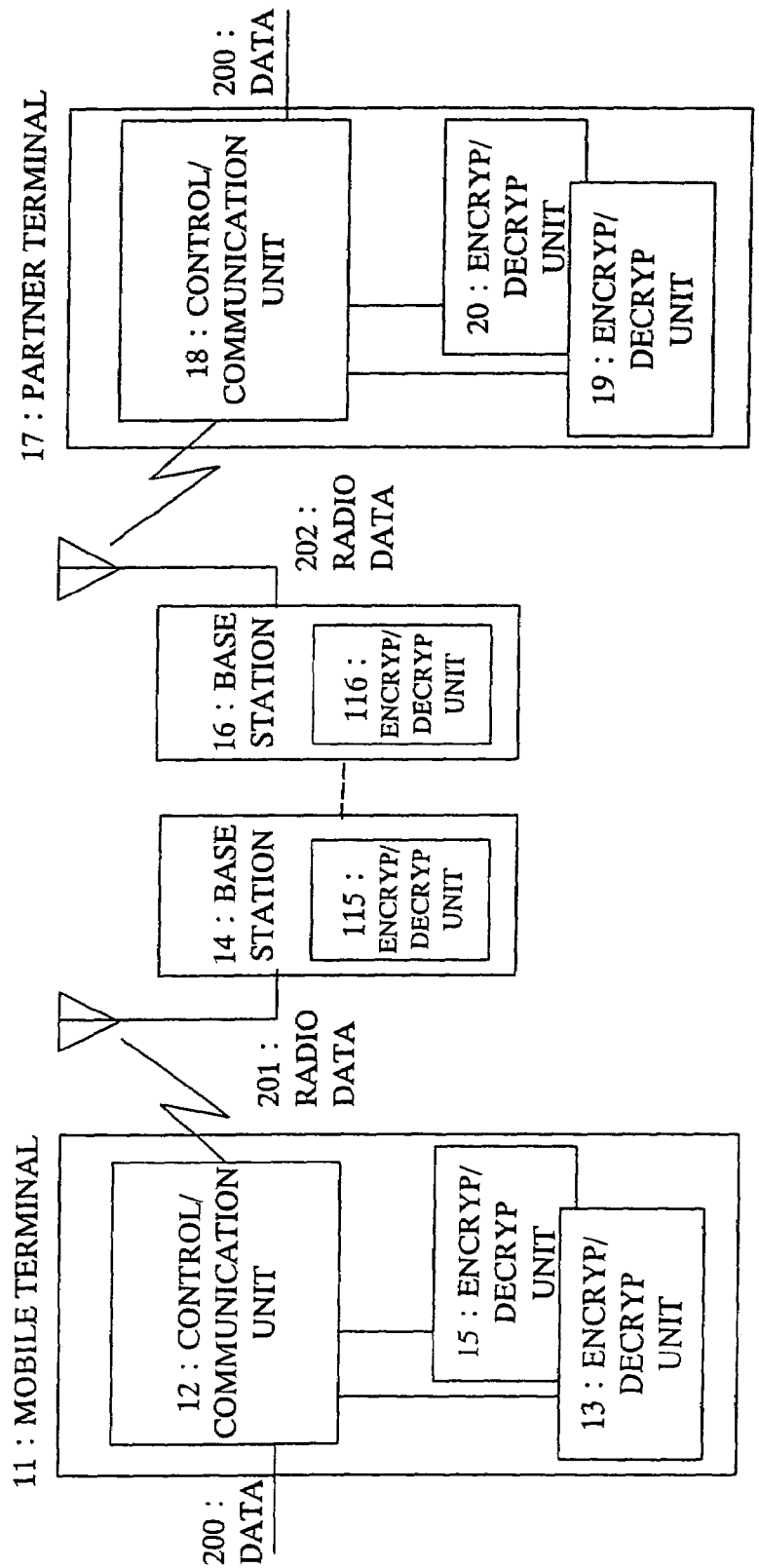
FIG. 4 is a block diagram showing an embodiment of another related art.

FIG. 2 shows a configuration of the mobile communication system according to another embodiment of the invention for the above case.

In the figure, a reference numeral 1 shows a mobile terminal, 2 and 7 show control/communication units, 3 and 8 show encrypting/decrypting units performing processes for the same encryption/decryption, 4 and 5 show base stations, 6 shows a partner terminal, 104 and 105 show encrypting/decrypting units performing processes for encryption/decryption at the base stations 4 and 5.

Next, the operation will be described.

In a mobile communication network/service, data 100 is first input to the control/communication unit 2 of the mobile terminal 1, and the data 100 is encrypted using a common key (hereinafter, referred to as common key A), which is shared between the mobile terminal 1 and the partner terminal 6, by the encrypting/decrypting unit 3. The encrypted result is processed by the control/communication unit 2, if necessary, the result is further encrypted using a common key (hereinafter, referred to as common key B), which is shared between the mobile terminal 1 and the base station 4, by the encrypting/decrypting unit 3 again, and radio data 101 is output from the control/communication unit 2. At the base station 4 which receives the radio data 101, the radio data 101 is decrypted using the common key B by the encrypting/decrypting unit 104, and the decrypted data is sent to the base station 5 of the partner terminal. At the base station 5, the decrypted data is encrypted using a common key (hereinafter, referred to as common key C), which is shared between the partner terminal 6 and the base station 5, by the encrypting/decrypting unit 105, and the radio data 102 is output. At the partner terminal 6 which receives the radio data 102, the radio data 102 is decrypted using the common key C by the encrypting/decrypting unit 8 through the control/communication unit 7. The decrypted result is processed by the control/communication unit 7, if necessary, the result is further decrypted using the common key A by the encrypting/decrypting unit 8, and the original data 100 is obtained.

Further, the same operation can be done in case of data communication from the partner terminal 6 to the mobile terminal 1.

In the above case, the control/communication unit 2 and the encrypting/decrypting unit 3, and the control/communication unit 7 and the encrypting/decrypting unit 8 can be configured as one units, respectively. And the encrypting/decrypting units 3, 8, 104, and 105 can be the same.

EMBODIMENT 3

In the foregoing embodiments, the case of plural different mobile communication networks/services and the case of a single mobile communication network/service have been discussed separately. The present invention can be applied to another case in which the above two cases are combined.

INDUSTRIAL APPLICABILITY

As described above, the same encrypting/decrypting unit is used for achieving confidentiality of data for communication of a single mobile terminal connected to plural different mobile communication networks/services with plural base stations, which enables to downsize the terminal.

Further, the same encrypting/decrypting unit is used for achieving confidentiality of data for communication of a single mobile terminal connected to a single mobile communication network/service with a base station and with a partner terminal, which enables to downsize the terminal.

Yet further, the same encrypting/decrypting unit is used for achieving confidentiality of data for communication with plural base stations and with a partner terminal, which enables to downsize the terminal.

The invention claimed is:

1. A mobile communication system, comprising:

a first mobile terminal; and a plurality of base stations, the first mobile terminal achieving confidentiality of data communicated with a base station amongst the plurality of base stations on an air link and with a second mobile terminal connected via the air link, the first mobile terminal and second mobile terminal using a first shared common encryption/decryption key to encrypt and decrypt the communicated data sent and received between the first mobile terminal and the second mobile terminal;

the encrypted data using the first shared common encryption/decryption key being encrypted using a second shared common encryption/decryption key shared between the first mobile terminal and said base station amongst the plurality of base stations, the base station decrypting the data using the second shared common encryption/decryption key and transferring the encrypted data using the first shared common encryption/decryption key to a second base station for forwarding to the second mobile terminal, wherein the second base station encrypts the received encrypted data using a third shared common encryption/decryption key shared between the second base station and second mobile terminal, the second mobile terminal being able to decrypt the received encrypted data from the second base station using both the third and first shared common encryption/decryption keys.

2. A mobile communication system, comprising:

a plurality of mobile terminals; and a plurality of base stations, the plurality of mobile terminals communicating with each other through the plurality of base stations, where each of the plurality of mobile terminals and plurality of base stations include a common single encryption/decryption device such that each of the plurality of mobile terminals and plurality of base stations are able to encrypt and decrypt data communicated between the plurality of mobile terminals and plurality of base stations, and wherein the plurality of mobile terminals share a common encryption/decryption key, enabling each of the plurality of terminals to encrypt and decrypt data sent and received between each of the plurality of terminals, whereas each of the plurality of mobile terminals and each of the plurality of base station also share a common encryption/decryption key between them, different from the encryption/decryption key shared between the plurality of terminals.

* * * * *